United States Patent
Peng et al.

(10) Patent No.: US 11,587,300 B2
(45) Date of Patent: Feb. 21, 2023

(54) METHOD AND APPARATUS FOR GENERATING THREE-DIMENSIONAL VIRTUAL IMAGE, AND STORAGE MEDIUM

(71) Applicant: BEIJING BAIDU NETCOM SCIENCE AND TECHNOLOGY CO., LTD., Beijing (CN)

(72) Inventors: Zhe Peng, Beijing (CN); Guanbo Bao, Beijing (CN); Yuqiang Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/473,529

(22) Filed: Sep. 13, 2021

(65) Prior Publication Data

US 2021/0407216 A1 Dec. 30, 2021

(51) Int. Cl.
*G06T 19/20* (2011.01)
*G06V 40/16* (2022.01)
(Continued)

(52) U.S. Cl.
CPC ............ *G06T 19/20* (2013.01); *G06K 9/6217* (2013.01); *G06T 15/04* (2013.01); *G06T 17/00* (2013.01);
(Continued)

(58) Field of Classification Search
CPC ......... G06T 19/20; G06T 15/04; G06T 17/00; G06T 2219/2021; G06K 9/6217;
(Continued)

(56) References Cited

U.S. PATENT DOCUMENTS

2015/0125049 A1* 5/2015 Taigman ............... G06V 40/168
382/118
2017/0154461 A1* 6/2017 Rhee ................... G06V 10/7557
(Continued)

FOREIGN PATENT DOCUMENTS

| CN | 108985241 A | 12/2018 |
|----|-------------|---------|
| JP | 2019145108 A | 8/2019 |
| JP | 2020177620 A | 10/2020 |

OTHER PUBLICATIONS

Zhe et al. "Facial Image Generation Method and Apparatus, Device and Storage Medium", WO2020192568 (PCT-CN2020-080335), WIPO, 2020 (Year: 2020).*

(Continued)

*Primary Examiner* — YuJang Tswei
(74) *Attorney, Agent, or Firm* — Lippes Mathias LLP

(57) ABSTRACT

The disclosure provides a method for generating a three-dimensional virtual image. The method includes: obtaining a face image to be processed and a three-dimensional reference model; obtaining a three-dimensional face model, face attribute information and face image information by inputting the face image to be processed into a trained neural network; obtaining a three-dimensional image model by performing a deformation process on the three-dimensional reference model based on the three-dimensional face model; and obtaining a target virtual image by adjusting the three-dimensional image model based on the face attribute information and the face image information.

15 Claims, 4 Drawing Sheets

(51) Int. Cl.
    *G06K 9/62* (2022.01)
    *G06T 15/04* (2011.01)
    *G06T 17/00* (2006.01)
    *G06V 10/44* (2022.01)
    *G06N 3/08* (2006.01)
    *G06V 10/70* (2022.01)
    *G06N 3/04* (2006.01)
(52) U.S. Cl.
    CPC .......... *G06V 40/165* (2022.01); *G06V 40/171* (2022.01); *G06N 3/0454* (2013.01); *G06N 3/08* (2013.01); *G06T 2219/2021* (2013.01); *G06V 10/454* (2022.01); *G06V 10/70* (2022.01)
(58) Field of Classification Search
    CPC .. G06V 40/165; G06V 40/171; G06V 10/454; G06V 10/70; G06N 3/0454; G06N 3/08
    See application file for complete search history.

(56) References Cited

U.S. PATENT DOCUMENTS

| | | | |
|---|---|---|---|
| 2020/0042769 A1* | 2/2020 | Yan | G06T 3/40 |
| 2020/0057883 A1* | 2/2020 | Ge | G06V 40/174 |
| 2020/0312043 A1* | 10/2020 | Peng | G06T 7/90 |
| 2021/0049347 A1* | 2/2021 | Zhao | G06T 7/74 |

OTHER PUBLICATIONS

Office Action for Japanese Application No. 2021-174058, dated Sep. 20, 2022, 4 pages.

* cited by examiner

METHOD AND APPARATUS FOR GENERATING THREE-DIMENSIONAL VIRTUAL IMAGE, AND STORAGE MEDIUM

CROSS-REFERENCE TO RELATED APPLICATION

The present application is based upon and claims priority to Chinese Patent Application No. 202011240898.1, filed on Nov. 9, 2020, the entirety contents of which are incorporated herein by reference.

TECHNICAL FIELD

The disclosure relates to artificial intelligence fields in the field of data processing technology, such as computer vision technology, deep learning, and augmented reality, in particular to a method for generating a three-dimensional virtual image, an apparatus for generating a three-dimensional virtual image, and a storage medium.

BACKGROUND

Artificial intelligence is a study using computers to simulate certain human thinking processes and intelligent behaviors (such as learning, reasoning, thinking and planning), which includes both hardware-level technologies and software-level technologies. Artificial intelligence technology generally includes technologies such as sensors, dedicated artificial intelligence chips, cloud computing, distributed storage and big data processing. Artificial intelligence software technologies mainly include computer vision technology, speech recognition technology, natural language processing technology, machine learning/deep learning, big data processing technology, knowledge map technology and other major directions.

SUMMARY

The embodiments of this disclosure provide a method for generating a three-dimensional virtual image, an apparatus for generating a three-dimensional virtual image, and a storage medium.

Embodiments of the disclosure provide a method for generating a three-dimensional virtual image. The method includes: obtaining a face image to be processed and a three-dimensional reference model; obtaining a three-dimensional face model, face attribute information and face image information by inputting the face image to be processed into a trained neural network; obtaining a three-dimensional image model by performing a deformation process on the three-dimensional reference model based on the three-dimensional face model; and obtaining a target virtual image by adjusting the three-dimensional image model based on the face attribute information and the face image information.

Embodiments of the disclosure provide an apparatus for generating a three-dimensional virtual image. The apparatus includes: one or more processors; a memory storing instructions executable by the one or more processors; in which the one or more processors are configured to: obtain a face image to be processed and a three-dimensional reference model; obtain a three-dimensional face model, face attribute information and face image information by inputting the face image to be processed into a trained neural network; obtain a three-dimensional image model by performing a deformation process on the three-dimensional reference model based on the three-dimensional face model, obtain a target virtual image by adjusting the three-dimensional image model based on the face attribute information and the face image information.

Embodiments of the disclosure provide a non-transitory computer-readable storage medium storing computer instructions. The computer instructions are used to make the computer implement the method for generating a three-dimensional virtual image according to the above embodiments. The method includes: obtaining a face image to be processed and a three-dimensional reference model; obtaining a three-dimensional face model, face attribute information and face image information by inputting the face image to be processed into a trained neural network; obtaining a three-dimensional image model by performing a deformation process on the three-dimensional reference model based on the three-dimensional face model; and obtaining a target virtual image by adjusting the three-dimensional image model based on the face attribute information and the face image information.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Currently, virtual images are more widely used in the market, the virtual images include both real people and cartoons. In the related art, users are required to edit their favorite virtual images by themselves. However, this editing process is relatively cumbersome, and if the users are not satisfied with the outcome, re-editing is time-consuming.

A method for generating a three-dimensional virtual image, an apparatus for generating a three-dimensional virtual image, an electronic device and a storage medium according to embodiments of the disclosure are described below with reference to the drawings.

In actual application scenarios, virtual cartoon images are used in animation and online games to interact, users are required to edit their favorite virtual images by themselves. However, this editing process is relatively cumbersome, and if the users are not satisfied with the outcome, re-editing is time-consuming.

In response to the above problems, the disclosure provides a method for generating a three-dimensional virtual image to obtain the face image to be processed and the three-dimensional reference model. The face image to be processed is input into the trained neural network to obtain the three-dimensional face model and the face attribute information and the face image information. The three-dimensional image model is obtained by performing the deformation process on the three-dimensional reference model based on the three-dimensional face model. The target virtual image is obtained by adjusting the three-dimensional image model based on the face attribute information and the face image information. Thus, by selecting the face image and the three-dimensional reference model, the virtual image is generated rapidly and accurately. The operation is simple and convenient, the efficiency and accuracy of generating the three-dimensional virtual image are improved, and the user needs are met.

Figure 1:
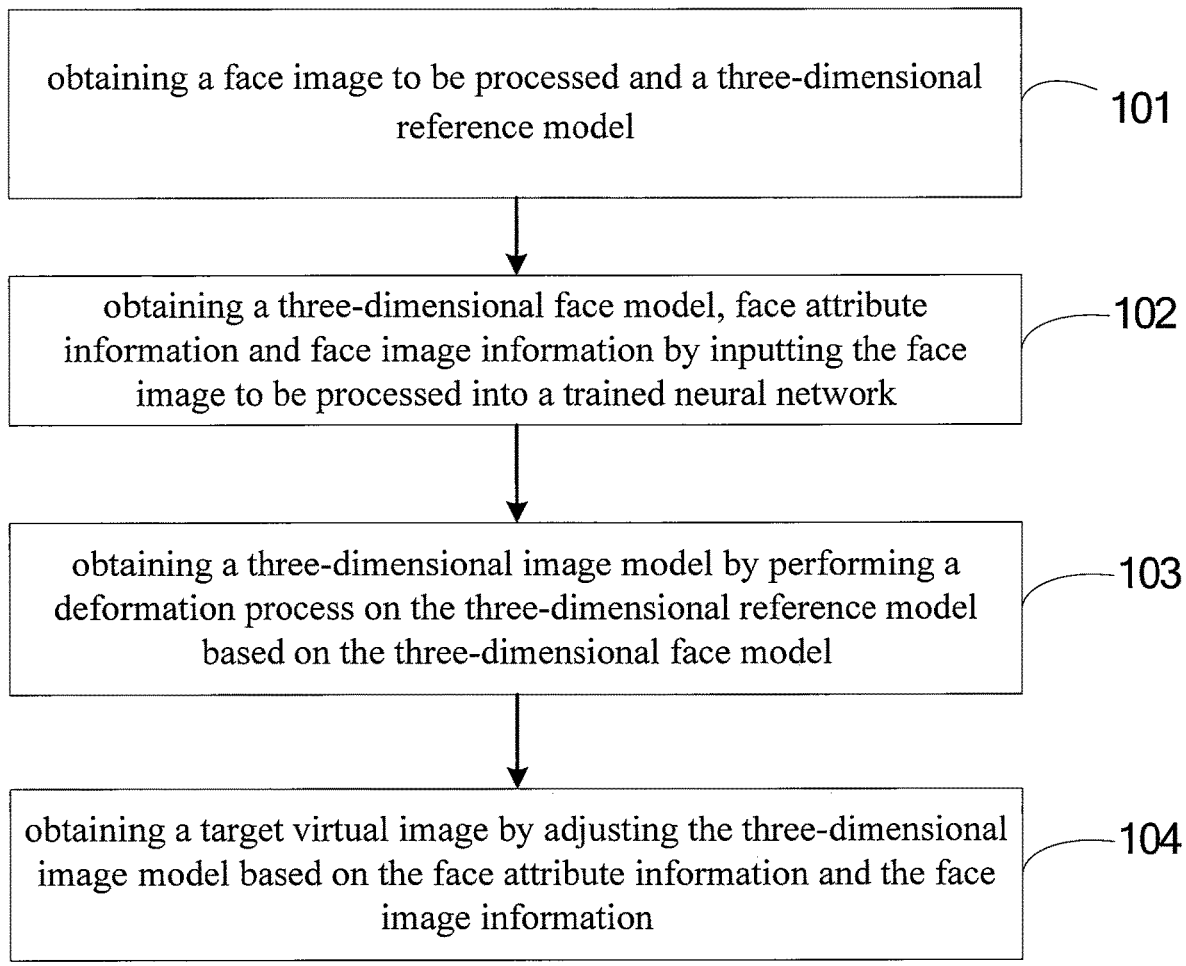
FIG. 1 is a flowchart of a method for generating a three-dimensional virtual image according to Embodiment 1 of the disclosure.

In detail, FIG. 1 is a flowchart of a method for generating a three-dimensional virtual image according to Embodiment 1 of the disclosure. An organization authority processing method is applied in an electronic device, the electronic device may be any device with computing capabilities, such as a personal computer (PC) and a mobile terminal. The mobile terminal may be, for example, a mobile phone, a tablet computer, a personal digital assistant, a wearable device, a vehicle-mounted device, and other hardware devices with various operating systems, touch screens, and/or display screens, such as smart TVs, smart refrigerators, and the like.

As illustrated in FIG. 1, the method includes the following steps. At step 101, a face image to be processed and a three-dimensional reference model are obtained.

In an embodiment, the face image to be processed refers to an image that includes a face. There are many ways to obtain the face image to be processed. The specific settings may be selected according to different application scenarios.

In a first example, the face image to be processed is obtained by photographing using a photographing device in a scene that contains a face.

In a second example, the image containing the face is determined as the face image to be processed based on a plurality of images obtained through screenshotting or sub-frame processing videos.

In a third example, the image containing the face is directly obtained as the face image to be processed.

In an embodiment, the three-dimensional reference model is a preset model established through a three-dimensional model building network or model. Generally, the three-dimensional reference model directly selected by the user may be of different types, such as cute, beautiful and other types of three-dimensional reference models.

At step 102, a three-dimensional face model, face attribute information and face image information are obtained by inputting the face image to be processed into a trained neural network.

In an embodiment, the trained neural network may be a convolutional neural network or a cyclic neural network, which is specifically selected and set according to the requirements of the application scenario, and multi-task neural networks may be performed simultaneously, such as classification task training and regression task. The neural network trained in the classification task extracts types of hair style and decorative items of the face image to be processed, and the neural network trained in the regression task extracts hair texture colors of the face image to be processed.

As a possible implementation, the pre-trained neural network obtains a large number of face image samples, and key points (such as eyes, mouth, nose, and eyebrows) of the face are calibrated on the face image samples, and the calibrated face image samples are trained for model training through a three-dimensional face deformation model.

In detail, annotated information of the face key points is mapped according to the three-dimensional mapping relation to generate a three-dimensional sample face model. The vector matrix of the three-dimensional sample face model is extracted, and the three-dimensional face construction model is constructed according to the vector matrix. The three-dimensional face construction model is trained based on the three-dimensional sample face model, and the three-dimensional face construction model including the preset vector matrix is obtained.

In detail, a perspective projection relation (one-to-one correspondence) between the three-dimensional face model and the input face image is established during training. In other words, a corresponding three-dimensional face model is obtained by inputting a face image in the trained neural network.

As a possible implementation, the feature vector of the face image to be processed is extracted through the trained neural network, and the three-dimensional face model is obtained according to the feature vector and the pre-established vector matrix.

It is understood that there is a fixed perspective projection relation (which is preset before training) between the three-dimensional model and the face image. Through the three-dimensional face model, the preset perspective projection relation is obtained, the face area in the face image is determined, and a pixel value of the face area is obtained as a face texture color. The face texture color is determined as the face attribute information, which is texture information of the three-dimensional face model.

In an embodiment, a large number of calibrated face images are trained, regression task is performed on different hair texture colors, and parameters of the neural network are continuously optimized through loss function. The trained neural network is obtained. The trained neural network extracts the hair texture color of the face image to be processed, and the hair texture color is used as the face attribute information.

In an embodiment, a large number of calibrated face images are trained, classification task is performed on different hairstyles, glasses and other decorative items, and the parameters of the neural network are continuously optimized through loss function. The trained neural network is obtained. The trained neural network extracts the types of hair styles and decorative items in the face image to be processed through the trained neural network.

At step 103, a three-dimensional image model is obtained by performing a deformation process on the three-dimensional reference model based on the three-dimensional face model.

In an embodiment, there are many ways to obtain the three-dimensional image model, which may be selected and set according to the needs of the application scenario. For example, obtaining the three-dimensional image model by performing the deformation process on the three-dimensional reference model based on the three-dimensional face model includes: determining a first deformation area of the three-dimensional face model and a second deformation area of the three-dimensional reference model, in which the first deformation area and the second deformation area are in a mapping relation; calibrating a first key point of the first deformation area and a second key point of the second deformation area; and controlling the first key point to be deformed to cause the second key point to be deformed correspondingly based on the mapping relation, so as to generate the three-dimensional image model.

In detail, deformation areas (such as cheeks, mouth, eyes, eyebrows and nose) are determined by calibrating the key points in the deformation area by the three-dimensional face model and the three-dimensional reference model, and according to the deformation of the calibrated key points on the three-dimensional face model, the corresponding key points on the three-dimensional reference model are deformed, so that the deformed cartoon image is similar in shape to the face image to be processed.

As another possible implementation, a one-to-one correspondence between the key points in the three-dimensional face model and the three-dimensional reference model is obtained, and the key points of the three-dimensional reference model are adjusted to generate the three-dimensional image model according to the key points (such as cheeks, mouth, eyes, eyebrows and nose) of the three-dimensional face model.

The deformation areas may be determined based on application scenario requirements, one or more deformation areas, and each key point in the deformation area are preset, so as to directly deform the three-dimensional reference model based on the three-dimensional face model, and to further improve the efficiency of generating the three-dimensional virtual image.

At step 104, a target virtual image is obtained by adjusting the three-dimensional image model based on the face attribute information and the face image information.

In the embodiments of the disclosure, the face attribute information may be the face texture color of the face area and the hair texture color of the hair area, and the corresponding area of the three-dimensional image model is adjusted according to the face texture color of the face area and the hair texture color of the hair area, so that the hair color and skin color of the virtual image are similar to the skin color and hair color of the face image to be processed. The face image information may be hairstyles such as long curly hairstyles and short hair, and the decorative items may be glasses and earrings. The three-dimensional image model is continuously adjusted based on the face image information, so that the hair style and the decorative items of the virtual image are similar to the hair style and the decorative items of the face image to be processed, to obtain the target virtual image.

In other words, a virtual image is generated from a single face image (which may be a cartoon or a real person, and is determined by the three-dimensional reference model). Firstly, the three-dimensional modeling is performed on the face image to obtain the three-dimensional face model, and then based on the three-dimensional face model, the three-dimensional reference model is deformed to obtain the three-dimensional image model. The texture color of the three-dimensional image model is adjusted according to the texture of the face in the face image, and the hair color and hair style of the three-dimensional image model are adjusted according to the hair color and hair style of the character in the image.

In conclusion, according to the method for generating a three-dimensional virtual image of the disclosure, the face image to be processed and the three-dimensional reference model are obtained. The three-dimensional face model, the face attribute information and the face image information are obtained by inputting the face image to be processed into the trained neural network. The three-dimensional image model is obtained by performing the deformation process on the three-dimensional reference model based on the three-dimensional face model. The target virtual image is obtained by adjusting the three-dimensional image model based on the face attribute information and the face image information. Therefore, by selecting the face image and the three-dimensional reference model, the virtual image is generated rapidly and accurately. The operation is simple and convenient, the efficiency and accuracy of generating the three-dimensional virtual image are improved, and the user needs are satisfied.

Figure 2:
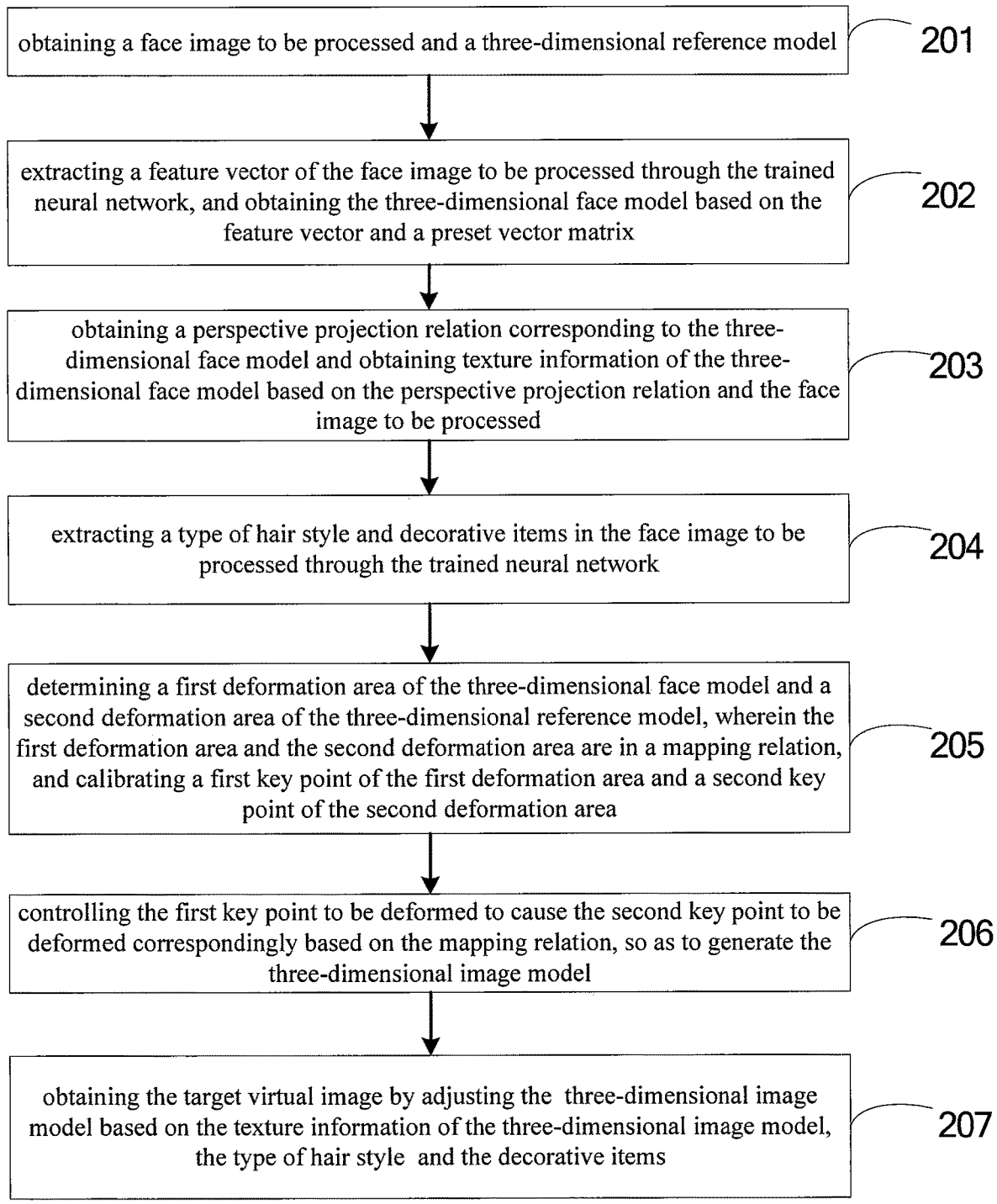
FIG. 2 is a flowchart of a method for generating a three-dimensional virtual image according to Embodiment 2 of the disclosure.

FIG. 2 is a flowchart of a method for generating a three-dimensional virtual image according to Embodiment 2 of the disclosure. As illustrated in FIG. 2, the method includes the following steps.

At step 201, a face image to be processed and a three-dimensional reference model are obtained.

In the embodiments of the disclosure, the face image to be processed refers to an image that includes a face. There are many ways to obtain the face image to be processed. The specific settings are selected according to the application scenario.

In a first example, the face image to be processed is obtained by photographing using a photographing device in a scene contains a face.

In a second example, the image containing the face is determined as the face image to be processed based on a plurality of images obtained through screenshotting or sub-frame processing videos.

In a third example, the image including the face is directly obtained as the face image to be processed.

In the embodiments of the disclosure, the three-dimensional reference model is a model that has been established in advance through a three-dimensional model building network or model. Generally, the three-dimensional reference models directly selected by the user may be different types of three-dimensional reference models, such as cute, beautiful and other types of three-dimensional reference models.

At step 202, a feature vector of the face image to be processed is extracted through the trained neural network, and the three-dimensional face model is obtained based on the feature vector and a preset vector matrix.

In the embodiments of the disclosure, the trained neural network is understood as the trained three-dimensional face construction model, the face image to be processed is processed to obtain a one-dimensional feature vector, and a combination of a product of the feature vector and the pre-established vector matrix represents a three-dimensional face model.

At step 203, a perspective projection relation corresponding to the three-dimensional face model is obtained, and texture information of the three-dimensional face model is obtained based on the perspective projection relation and the face image to be processed.

In the embodiments of the disclosure, the three-dimensional model and the face image have a fixed perspective projection relation, and the preset perspective projection relation is obtained through the three-dimensional face model, and the face area of the face image is determined, a pixel value is determined as the face texture color, and the face texture color is used as the face attribute information, that is, the texture information of the three-dimensional face model.

In the embodiments of the disclosure, a large number of calibrated face images are trained, and regression tasks are performed on different hair texture colors, and the parameters of the neural network are continuously optimized through the loss function to obtain the trained neural network. The trained neural network extracts the hair texture color of the face image to be processed, and determines the hair texture color as the face attribute information.

At step 204, a type of hair style and decorative items in the face image to be processed are extracted through the trained neural network.

In the embodiments of the disclosure, a large number of calibrated face images are trained, different hairstyles, glasses and other decorative items are classified, and the parameters of the neural network are continuously optimized through the loss function to obtain the trained neural network, which extracts the types of hair style and the decorative items of the face image to be processed through the trained neural network.

At step 205, a first deformation area of the three-dimensional face model and a second deformation area of the three-dimensional reference model are determined, the first deformation area and the second deformation area are in a mapping relation, a first key point of the first deformation area and a second key point of the second deformation area are calibrated.

At step 206, the first key point is controlled to be deformed to cause the second key point to be deformed correspondingly based on the mapping relation, so as to generate the three-dimensional image model.

In the embodiments of the disclosure, the first deformation area and the second deformation area are in a mapping relation, i.e., one-to-one mapping relation such as nose-nose and mouth-mouth, to determine the deformation areas (such as cheeks, mouth, eyes, eyebrows and nose). The key points corresponding to the deformation area on the three-dimensional face model and the three-dimensional reference model are calibrated. According to the deformation of the calibrated key points on the three-dimensional face model, the corresponding key points on the three-dimensional reference model are deformed to make the deformed cartoon image similar in shape to the face image to be processed.

At step 207, the three-dimensional image model is adjusted according to the texture information, the types of hair style and decorative items of the three-dimensional face model to obtain the target virtual image.

In the embodiments of the disclosure, the face attribute information may be the face texture color of the face area and the hair texture color of the hair area, the corresponding area of the three-dimensional image model is adjusted according to the face texture color of the face area and the hair texture color of the hair area, so that the hair color and skin color of the virtual image are similar to the skin color and hair color of the face image to be processed. The face image information may be hairstyles, decorative items such as glasses and earrings, and the three-dimensional image model is continuously adjusted according to the face image information, so that the hairstyle and decorative items of the virtual image are similar to the hairstyle and decorative items of the face image to be processed, and the target virtual image is generated.

In conclusion, according to the method for generating the three-dimensional virtual image of the disclosure, the face image to be processed and the three-dimensional reference model are obtained. The feature vector of the face image to be processed is extracted through the trained neural network, and the three-dimensional face model is obtained based on the feature vector and the preset vector matrix. The perspective projection relation corresponding to the three-dimensional face model is obtained, and the texture information of the three-dimensional face model is obtained based on the perspective projection relation and the face image to be processed. The type of hair style and decorative items in the face image to be processed are extracted through the trained neural network. The first deformation area of the three-dimensional face model and the second deformation area of the three-dimensional reference model are determined, and the first deformation area and the second deformation area are in a mapping relation. The first key point of the first deformation area and the second key point of the second deformation area are calibrated. The first key point is controlled to be deformed to cause the second key point to be deformed correspondingly based on the mapping relation, so as to generate the three-dimensional image model. The three-dimensional image model is adjusted according to the texture information, the types of hair style and decorative items of the three-dimensional face model to obtain the target virtual image. Therefore, by selecting the face image and the three-dimensional reference model, the virtual image is generated rapidly and accurately. The operation is simple and convenient, the efficiency and accuracy of generating the three-dimensional virtual image are improved, and the user needs are satisfied.

Figure 3:
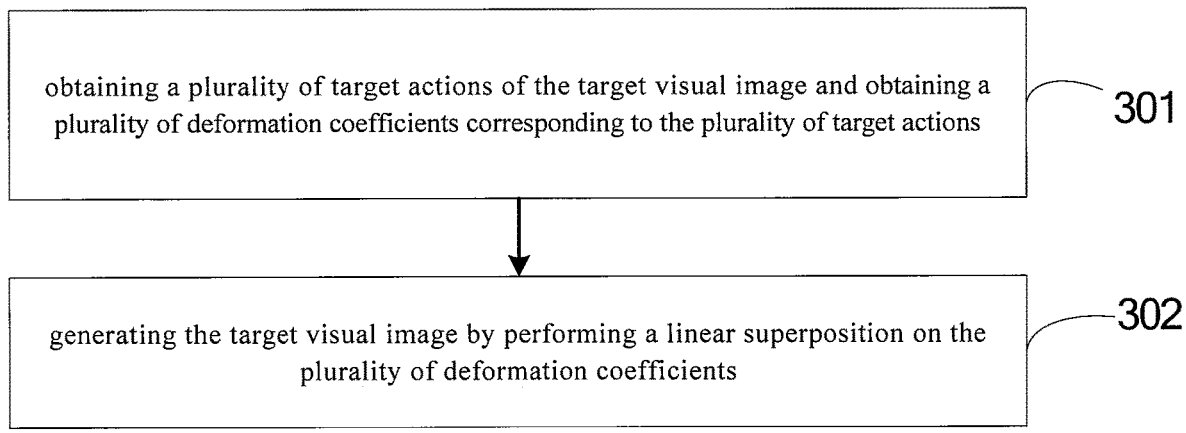
FIG. 3 is a flowchart of a method for generating a three-dimensional virtual image according to Embodiment 3 of the disclosure.

Based on the description of the embodiments, after the virtual image is generated, in order to further meet the user needs, that is, the interaction needs of the user are met by driving the virtual image, a detailed description is made specifically with reference to FIG. 3.

FIG. 3 is a flowchart of a method for generating a three-dimensional virtual image according to Embodiment 3 of the disclosure. As illustrated in FIG. 3, the method includes the following steps.

At step 301, a plurality of target actions of the target visual image are obtained, and a plurality of deformation coefficients corresponding to the plurality of target actions are obtained.

At step 302, the target visual image is generated by performing a linear superposition on the plurality of deformation coefficients.

In an embodiment, after determining the target actions (e.g., closing eyes, opening eyes and nodding), the deformation coefficient corresponding to the target action are selected, and the target visual image is generated by performing the linear superposition on the plurality of deformation coefficients.

It is understood that actions are generated by performing the linear superposition on a series of already made target actions, and driving is performed by controlling the linear coefficient.

For example, an eye-closing action corresponds to deformation factor 1, and an eye-opening action corresponds to deformation factor 2. The deformation factor 1 and the deformation factor 2 are linearly superimposed to obtain the target-driven visual image, that is, the target-driven visual image is controlled to drive, so as to achieve a blinking action of the visual image from closing eyes to opening eyes.

In conclusion, according to the method for generating a three-dimensional visual image of the disclosure, a plurality of target actions of the target visual image are obtained, a plurality of deformation coefficients corresponding to a plurality of target actions are determined by performing the linear superposition on the plurality of deformation coefficients to generate the target-driven visual image. Therefore, the target visual image is controlled by the deformation coefficients to meet the user's interaction needs.

Figure 4:
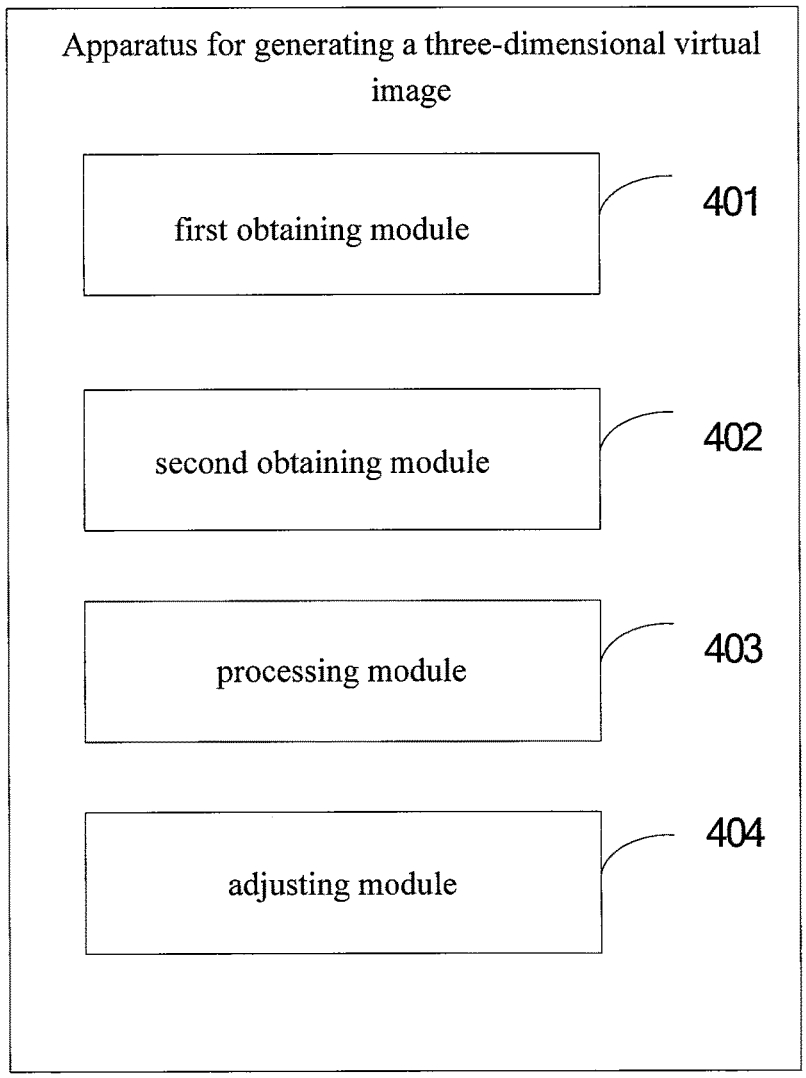
FIG. 4 is a schematic diagram of an apparatus for generating a three-dimensional virtual image according to Embodiment 4 of the disclosure.

In order to implement the above embodiments, the disclosure provides an apparatus for generating a three-dimensional virtual image. FIG. 4 is a schematic diagram of an apparatus for generating a three-dimensional virtual image according to Embodiment 4 of the disclosure. As illustrated in FIG. 4, the apparatus for generating a three-dimensional virtual image includes: a first obtaining module 401, a second obtaining module 402, a processing module 403 and an adjusting module 404.

The first obtaining module 401 is configured to obtain a face image to be processed and a three-dimensional reference model.

The second obtaining module 402 is configured to obtain a three-dimensional face model, face attribute information and face image information by inputting the face image to be processed into a trained neural network.

The processing module 403 is configured to obtain a three-dimensional image model by performing a deformation process on the three-dimensional reference model based on the three-dimensional face model.

The adjusting module 404 is configured to obtain a target virtual image by adjusting the three-dimensional image model based on the face attribute information and the face image information.

In an embodiment, the second obtaining module 402 is further configured to: extract a feature vector of the face image to be processed through the trained neural network; and obtain the three-dimensional face model based on the feature vector and a preset vector matrix.

In an embodiment, the second obtaining module 402 is further configured to: obtain a perspective projection relation corresponding to the three-dimensional face model; and obtain texture information of the three-dimensional face model based on the perspective projection relation and the face image to be processed.

In an embodiment, the second obtaining module 402 is further configured to: extract a type of hair style and decorative items in the face image to be processed through the trained neural network.

In an embodiment, the processing module 403 is further configured to: determine a first deformation area of the three-dimensional face model and a second deformation area of the three-dimensional reference model, in which the first deformation area and the second deformation area are in a mapping relation; calibrate a first key point of the first deformation area and a second key point of the second deformation area; and control the first key point to be deformed to cause the second key point to be deformed correspondingly based on the mapping relation, so as to generate the three-dimensional image model.

It should be noted that the explanation of the method for generating a three-dimensional virtual image is also applicable for the apparatus for generating a three-dimensional virtual image according to the embodiments of the disclosure, and the implementation principle is similar, which is not repeated here.

In conclusion, through the apparatus for generating a three-dimensional virtual image, a face image to be processed and a three-dimensional reference model are obtained, a three-dimensional face model, face attribute information and face image information are obtained by inputting the face image to be processed into a trained neural network. A three-dimensional image model is obtained by performing a deformation process on the three-dimensional reference model based on the three-dimensional face model. A target virtual image is obtained by adjusting the three-dimensional image model based on the face attribute information and the face image information. Therefore, by selecting the face image and the three-dimensional reference model, the virtual image is generated rapidly and accurately. The operation is simple and convenient, which improves the efficiency and accuracy of generating the three-dimensional virtual image, thus user needs are met.

Based on the above embodiments, after the virtual image is generated, in order to further meet the user's needs, that is, to meet the user's interaction needs by driving the virtual image, specific process is described in detail with reference to FIG. 5.

Figure 5:
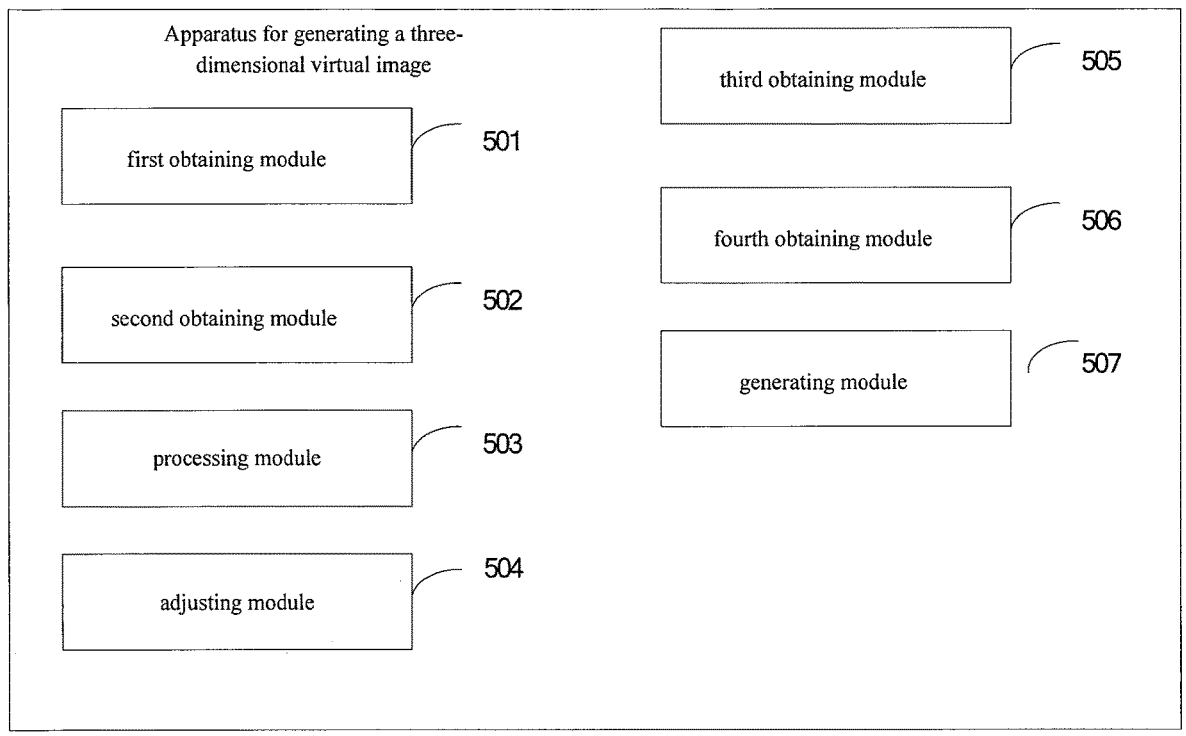
FIG. 5 is a schematic diagram of an apparatus for generating a three-dimensional virtual image according to Embodiment 5 of the disclosure.

As illustrated in FIG. 5, the apparatus for generating a three-dimensional virtual image includes: a first obtaining module 501, a second obtaining module 502, a processing module 503 and an adjusting module 504, a third obtaining module 505, a fourth obtaining module 506 and a generating module 507.

The first obtaining module 501, the second obtaining module 502, the processing module 503 and the adjusting module 504 correspond to the first obtaining module 401, the second obtaining module 402, the processing module 403 and the adjusting module 404 according to the above embodiments respectively. For details, refer to the description of the above apparatus embodiments, which is not described in detail here.

The third obtaining module 505 is configured to obtain a plurality of target actions of the target visual image.

The fourth obtaining module 506 is configured to obtain a plurality of deformation coefficients corresponding to the plurality of target actions.

The generating module 507 is configured to generate the target visual image by performing a linear superposition on the plurality of deformation coefficients.

In conclusion, according to the method for generating a three-dimensional virtual image of the disclosure, a plurality of target actions of the target visual image are obtained, and a plurality of deformation coefficients corresponding to the plurality of target actions are obtained. The target visual image is generated by performing a linear superposition on the plurality of deformation coefficients. Therefore, the target virtual image is controlled by the plurality of deformation coefficients to meet the user's interaction needs.

According to the embodiments of the disclosure, the disclosure provides an electronic device and a readable storage medium.

Figure 6:
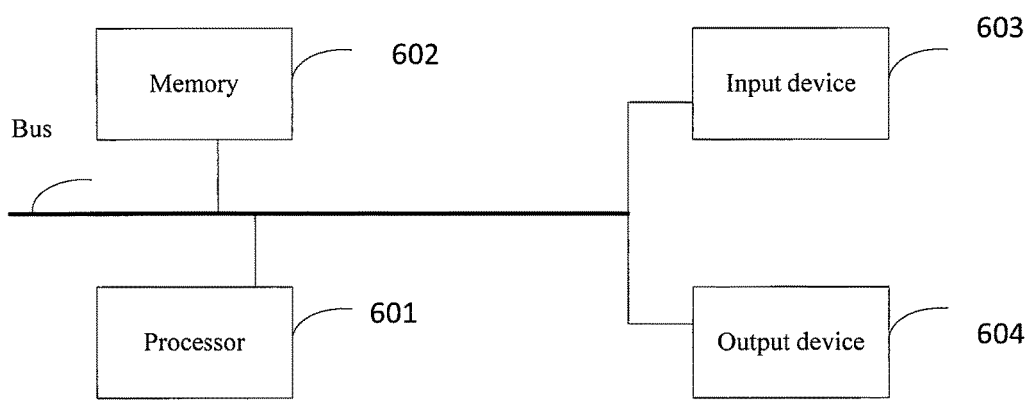
FIG. 6 is a block diagram of an electronic device used to implement the method for generating a three-dimensional virtual image according to embodiments of the disclosure.

FIG. 6 is a block diagram of an electronic device configured to implement the method for generating a three-dimensional virtual image according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: one or more processors 601, a memory 602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 601 is taken as an example in FIG. 6.

The memory 602 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 602 is configured to store non-transitory software programs, non-transitory computer executable programs and modules, such as program instructions/modules (for example, the first obtaining module 401, the second obtaining module 402, the processing module 403 and the adjusting module 404 shown in FIG. 4) corresponding to the method in the embodiments of the disclosure. The processor 601 executes various functional applications and data processing of the electronic device by running non-transitory software programs, instructions, and modules stored in the memory 602, that is, implementing the method in the foregoing method embodiments.

The memory 602 may include a storage program area and a storage data area, where the storage program area may store an operating system and application programs required for at least one function. The storage data area may store data created according to the use of the electronic device for implementing the method. In addition, the memory 602 may include a high-speed random access memory, and a non-transitory memory, such as at least one magnetic disk storage device, a flash memory device, or other non-transitory solid-state storage device. In some embodiments, the memory 602 may optionally include a memory remotely disposed with respect to the processor 601, and these remote memories may be connected to the electronic device for implementing the method through a network. Examples of the above network include, but are not limited to, the Internet, an intranet, a local area network, a mobile communication network, and combinations thereof.

The electronic device used to implement the method for generating a three-dimensional virtual image may further include: an input device 603 and an output device 604. The processor 601, the memory 602, the input device 603, and the output device 604 may be connected through a bus or in other manners. In FIG. 6, the connection through the bus is taken as an example.

The input device 603 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 604 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device. These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system to solve management difficulty and weak business scalability defects of traditional physical hosts and Virtual Private Server (VPS) services.

According to the technical solution of the embodiments of the disclosure, the face image to be processed and the three-dimensional reference model are obtained. The face image to be processed is input into the trained neural network to obtain the three-dimensional face model, face attribute information, and face image information. The three-dimensional image model is generated by performing the deformation process on the three-dimensional reference model based on the three-dimensional face model. The target virtual image is obtained by adjusting the three-dimensional image model based on the face attribute information and the face image information. Therefore, by selecting the face image and the three-dimensional reference model, the virtual image is generated rapidly and accurately. The operation is simple and convenient, which improves the efficiency and accuracy of generating the three-dimensional virtual image and meets user needs.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for generating a three-dimensional virtual image, comprising:
    obtaining a face image to be processed and a three-dimensional reference model;
    obtaining a three-dimensional face model, face attribute information and face image information by inputting the face image to be processed into a trained neural network;
    obtaining a three-dimensional image model by performing a deformation process on the three-dimensional reference model based on the three-dimensional face model; and
    obtaining a target virtual image by adjusting the three-dimensional image model based on the face attribute information and the face image information,
    wherein the method further comprises:
    obtaining a plurality of target actions of the target visual image;
    obtaining a plurality of deformation coefficients corresponding to the plurality of target actions; and
    generating the target visual image by performing a linear superposition on the plurality of deformation coefficients.

2. The method according to claim 1, wherein obtaining the three-dimensional face model by inputting the face image to be processed into the trained neural network comprises:
    extracting a feature vector of the face image to be processed through the trained neural network; and
    obtaining the three-dimensional face model based on the feature vector and a preset vector matrix.

3. The method according to claim 2, further comprising:
    obtaining a perspective projection relation corresponding to the three-dimensional face model; and
    obtaining texture information of the three-dimensional face model based on the perspective projection relation and the face image to be processed.

4. The method according to claim 1, wherein obtaining the face image information by inputting the face image to be processed into the trained neural network comprises:
    extracting a type of hair style and decorative items in the face image to be processed through the trained neural network.

5. The method according to claim 1, wherein obtaining the three-dimensional image model by performing the deformation process on the three-dimensional reference model based on the three-dimensional face model comprises:
    determining a first deformation area of the three-dimensional face model and a second deformation area of the three-dimensional reference model, wherein the first deformation area and the second deformation area are in a mapping relation;
    calibrating a first key point of the first deformation area and a second key point of the second deformation area; and
    controlling the first key point to be deformed to cause the second key point to be deformed correspondingly based on the mapping relation, so as to generate the three-dimensional image model.

6. An apparatus for generating a three-dimensional virtual image, comprising:
    one or more processors;
    a memory storing instructions executable by the one or more processors;
    wherein the one or more processors are configured to:
    obtain a face image to be processed and a three-dimensional reference model;
    obtain a three-dimensional face model, face attribute information and face image information by inputting the face image to be processed into a trained neural network;
    obtain a three-dimensional image model by performing a deformation process on the three-dimensional reference model based on the three-dimensional face model; and
    obtain a target virtual image by adjusting the three-dimensional image model based on the face attribute information and the face image information,
    wherein the one or more processors are further configured to:

obtain a plurality of target actions of the target visual image;

obtain a plurality of deformation coefficients corresponding to the plurality of target actions; and generate the target visual image by performing a linear superposition on the plurality of deformation coefficients.

7. The apparatus according to claim 6, wherein the one or more processors are further configured to:

extract a feature vector of the face image to be processed through the trained neural network; and obtain the three-dimensional face model based on the feature vector and a preset vector matrix.

8. The apparatus according to claim 7, wherein the one or more processors are further configured to:

obtain a perspective projection relation corresponding to the three-dimensional face model; and obtain texture information of the three-dimensional face model based on the perspective projection relation and the face image to be processed.

9. The apparatus according to claim 6, wherein the one or more processors are further configured to: extract a type of hair style and decorative items in the face image to be processed through the trained neural network.

10. The apparatus according to claim 6, wherein the one or more processors are further configured to:

determine a first deformation area of the three-dimensional face model and a second deformation area of the three-dimensional reference model, wherein the first deformation area and the second deformation area are in a mapping relation;

calibrate a first key point of the first deformation area and a second key point of the second deformation area; and control the first key point to be deformed to cause the second key point to be deformed correspondingly based on the mapping relation, so as to generate the three-dimensional image model.

11. A non-transitory computer-readable storage medium storing computer instructions, wherein the computer instructions are configured to make the computer execute a method for generating a three-dimensional virtual image, and the method comprises:

obtaining a face image to be processed and a three-dimensional reference model;

obtaining a three-dimensional face model, face attribute information and face image information by inputting the face image to be processed into a trained neural network;

obtaining a three-dimensional image model by performing a deformation process on the three-dimensional reference model based on the three-dimensional face model; and obtaining a target virtual image by adjusting the three-dimensional image model based on the face attribute information and the face image information, wherein the method further comprises:

obtaining a plurality of target actions of the target visual image, obtaining a plurality of deformation coefficients corresponding to the plurality of target actions; and generating the target visual image by performing a linear superposition on the plurality of deformation coefficients.

12. The storage medium according to claim 11, wherein obtaining the three-dimensional face model by inputting the face image to be processed into the trained neural network comprises:

extracting a feature vector of the face image to be processed through the trained neural network; and obtaining the three-dimensional face model based on the feature vector and a preset vector matrix.

13. The storage medium according to claim 12, wherein the method further comprises:

obtaining a perspective projection relation corresponding to the three-dimensional face model; and obtaining texture information of the three-dimensional face model based on the perspective projection relation and the face image to be processed.

14. The storage medium according to claim 11, wherein obtaining the face image information by inputting the face image to be processed into the trained neural network comprises:

extracting a type of hair style and decorative items in the face image to be processed through the trained neural network.

15. The storage medium according to claim 11, wherein obtaining the three-dimensional image model by performing the deformation process on the three-dimensional reference model based on the three-dimensional face model comprises:

determining a first deformation area of the three-dimensional face model and a second deformation area of the three-dimensional reference model, wherein the first deformation area and the second deformation area are in a mapping relation;

calibrating a first key point of the first deformation area and a second key point of the second deformation area; and controlling the first key point to be deformed to cause the second key point to be deformed correspondingly based on the mapping relation, so as to generate the three-dimensional image model.

* * * * *